United States Patent
Tomala et al.

(10) Patent No.: US 12,150,158 B2
(45) Date of Patent: Nov. 19, 2024

(54) HANDLING OF MULTIPLE MINIMIZATION OF DRIVE TEST CONTEXTS IN MULTIPLE RADIO RESOURCE CONTROLLER STATES

(71) Applicant: NOKIA TECHNOLOGIES OY, Espoo (FI)

(72) Inventors: Malgorzata Tomala, Wroclaw (PL); Anna Pantelidou, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 330 days.

(21) Appl. No.: 17/604,340

(22) PCT Filed: May 2, 2019

(86) PCT No.: PCT/EP2019/061242
§ 371 (c)(1),
(2) Date: Oct. 15, 2021

(87) PCT Pub. No.: WO2020/221455
PCT Pub. Date: Nov. 5, 2020

(65) Prior Publication Data
US 2022/0201703 A1    Jun. 23, 2022

(51) Int. Cl.
*H04W 72/542*     (2023.01)
*H04W 76/27*      (2018.01)

(52) U.S. Cl.
CPC ......... *H04W 72/542* (2023.01); *H04W 76/27* (2018.02)

(58) Field of Classification Search
None
See application file for complete search history.

(56) References Cited

U.S. PATENT DOCUMENTS

2013/0303129 A1    11/2013    Yi et al.

FOREIGN PATENT DOCUMENTS

| CN | 102077638 A | 5/2011 | |
| EP | 2360960 A2 * | 8/2011 | ............ H04W 24/10 |

(Continued)

OTHER PUBLICATIONS

Indian Office Action issued in corresponding Indian Patent Application No. 202147055192 on Apr. 1, 2022.
(Continued)

*Primary Examiner* — Jinsong Hu
*Assistant Examiner* — Alexander J Yi
(74) *Attorney, Agent, or Firm* — Lippes Mathias LLP

(57) ABSTRACT

Systems, methods, apparatuses, and computer program products for handling multiple minimization of drive test (MDT) contexts for uses in radio resource controller (RRC) states. One method may include receiving, from a network element, a logged measurement configuration including specific configuration content for a user equipment differentiated per and depending on a connection state of the user equipment. The method may also include performing logging of a measurement per the user equipments state according to the specific configuration content in the logged measurement configuration. The method may further include transmitting a report of the logged measurement pertaining to one of the user equipment states, to the network element. The specific configuration content may restrict the logging according to one or more of a network-based selection criteria, and user equipment-based selection criteria.

11 Claims, 12 Drawing Sheets

(56) References Cited

FOREIGN PATENT DOCUMENTS

| EP | 2849476 A1 | * | 3/2015 | ........... H04L 41/069 |
|---|---|---|---|---|
| WO | 2014/044299 A1 | | 3/2014 | |

OTHER PUBLICATIONS

European Office Action issued in corresponding European Patent Application No. 19 723 716.7-1216 on Aug. 9, 2023.

International Search Report and Written Opinion dated Jan. 9, 2020 corresponding to International Patent Application No. PCT/EP2019/061242.

CMCC, "Discussion on MDT procedures for Inactive UEs," 3GPP Draft, R2-1901950, 3GPP TSG RAN WG2 Meeting #105, Athens, Greece, Feb. 15, 2019, XP051603298.

Qualcomm Incorporated, "Discussion on MDT in NR," 3GPP Draft, R2-1900334, 3GPP TSG-RAN WG2 Meeting #105, Athens, Greece, Feb. 15, 2019, XP051601731.

3GPP TS 37.320 V15.0.0 (Jun. 2018), Technical Specification, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15), Jun. 2018.

3GPP TS 38.331 V15.5.1 (Apr. 2019), Technical Specification, 3rd Generation Partnership Project; Technical Specification Group Radio Access Network; NR; Radio Resource Control (RRC) protocol specification (Release 15), Apr. 2019.

CMCC, "Revised SID: Study on RAN-centric data collection and utilization for LTE and NR," 3GPP Draft; RP-182105, 3GPP TSG RAN Meeting #81, Gold Coast, Australia, Sep. 10-13, 2018.

Chinese Office Action issued in corresponding Chinese Patent Application No. 2019800960172 on May 31, 2024.

* cited by examiner

```
-- ASN1START

LoggedMeasurementConfiguration-r16 ::=  SEQUENCE {
    StateLoggingIndication::= ENUMERATED{idle, inactive},
    criticalExtensions                  CHOICE {
        c1                              CHOICE {
            loggedMeasurementConfiguration-r16    LoggedMeasurementConfiguration-r16-IEs,
            spare3 NULL, spare2 NULL, spare1 NULL
        },
        criticalExtensionsFuture        SEQUENCE {}
    }
}

LoggedMeasurementConfiguration-r16-IEs ::= SEQUENCE {
    traceReference-r16              TraceReference-r16,
    traceRecordingSessionRef-r16    OCTET STRING (SIZE (2)),
    tce-Id-r16                      OCTET STRING (SIZE (1)),
    absoluteTimeInfo-r16            AbsoluteTimeInfo-r16,
    areaConfiguration-r16           AreaConfiguration-r16           OPTIONAL,   -- Need R
    loggingDuration-r16             LoggingDuration-r16,
    loggingInterval-r16             LoggingInterval-r16,
    plmn-IdentityInfoList-r16       PLMN-IdentityInfoList-r15       OPTIONAL,   -- Need R
    bt-NameList-r16                 BT-NameList-r16                 OPTIONAL,   -- Need R
    wlan-NameList-r16               WLAN-NameList-r16               OPTIONAL,   -- Need R
    nonCriticalExtension            SEQUENCE {}                     OPTIONAL
}

-- ASN1STOP
```

FIG. 3

-- ASN1START

LoggedMeasurementConfiguration-r16 ::=  SEQUENCE { criticalExtensions          CHOICE {
    c1                          CHOICE {
        loggedMeasurementConfigurationIDLE-r16       LoggedMeasurementConfigurationIDLE-r16-IEs,
        loggedMeasurementConfigurationINACTIVE-r16   LoggedMeasurementConfigurationINACTIVE-r16-IEs,
        , spare2 NULL, spare1 NULL
    },
    criticalExtensionsFuture         SEQUENCE {}
    }
}

LoggedMeasurementConfigurationIDLE-r16-IEs ::= SEQUENCE {
    traceReference-r16              TraceReference-r166,
    traceRecordingSessionRef-r16    OCTET STRING (SIZE (2)),
    tce-Id-r16                      OCTET STRING (SIZE (1)),
    absoluteTimeInfo-r16            AbsoluteTimeInfo-r16,
    areaConfiguration-r16           AreaConfiguration-r166       OPTIONAL,    -- Need R
    loggingDuration-r16             LoggingDuration-r16,
    loggingInterval-r16             LoggingInterval-r16,
    plmn-IdentityInfoList-r16       PLMN-IdentitynfoList-r15     OPTIONAL,    -- Need R
    bt-NameList-r16                 BT-NameList-r16              OPTIONAL,    --Need R
    wlan-NameList-r16               WLAN-NameList-r16            OPTIONAL,    --Need R
    nonCriticalExtension            LoggedMeasurementConfiguration-v1080-IEs  OPTIONAL
}

LoggedMeasurementConfigurationINACTIVE-r16-IEs ::= SEQUENCE {
    traceReference-r16              TraceReference-r16,
    traceRecordingSessionRef-r16    OCTET STRING (SIZE (2)),
    tce-Id-r16                      OCTET STRING (SIZE (1)),
absoluteTimeInfo-r16            AbsoluteTimeInfo-r16,
    areaConfiguration-r16           AreaConfiguration-r16        OPTIONAL,    -- Need R
    loggingDuration-r16             LoggingDuration-r16,
    loggingInterval-r16             LoggingInterval-r16,
    plmn-IdentityInfoList-r16       PLMN-IdentitynfoList-r15     OPTIONAL,    -- Need R
    bt-NameList-r16                 BT-NameList-r16              OPTIONAL,    --Need R
    wlan-NameList-r16               WLAN-NameList-r16            OPTIONAL,    --Need R nonCriticalExtension            SEQUENCE {}    OPTIONAL
}

-- ASN1STOP

FIG. 4

```
-- ASN1START

VarLogMeasConfigIdle-r16 ::=    SEQUENCE{
    areaConfiguration-r16           AreaConfiguration-r16       OPTIONAL,
    loggingDuration-r16                 LoggingDuration-r16,
    loggingInterval-r16             LoggingInterval-r16,
    bt-NameList-r16                 BT-NameList-r16             OPTIONAL,
    wlan-NameList-r16               WLAN-NameList-r16               OPTIONAL
}

-- ASN1STOP
```

FIG. 5

```
-- ASN1START

VarLogMeasConfigInactive-r16 ::=    SEQUENCE {
    areaConfiguration-r16           AreaConfiguration-r16    OPTIONAL,
    loggingDuration-r16             LoggingDuration-r16,
    loggingInterval-r16             LoggingInterval-r16,
    bt-NameList-r16                 BT-NameList-r16                             OPTIONAL,
    wlan-NameList-r16               WLAN-NameList-r16                           OPTIONAL
}

-- ASN1STOP
```

FIG. 6

```
-- ASN1START

VarLogMeasReportIdle-r10 ::=    SEQUENCE {
    traceReference-r16              TraceReference-r16,
    traceRecordingSessionRef-r16    OCTET STRING (SIZE (2)),
    tce-Id-r16                      OCTET STRING (SIZE (1)),
    plmn-Identity-r16               PLMN-Identity,
    absoluteTimeInfo-r16            AbsoluteTimeInfo-r16
    idleLogMeasInfoList-r16             LogMeasInfoList-r16
}

LogMeasInfoList-r16 ::=    SEQUENCE (SIZE (1..maxLogMeas-r16)) OF LogMeasInfo-r16

-- ASN1STOP
```

FIG. 7

```
-- ASN1START

VarLogMeasReportInactive-r10 ::=    SEQUENCE {
    traceReference-r16              TraceReference-r16,
    traceRecordingSessionRef-r16    OCTET STRING (SIZE (2)),
    tce-Id-r16                      OCTET STRING (SIZE (1)),
    plmn-Identity-r16               PLMN-Identity,
    absoluteTimeInfo-r16            AbsoluteTimeInfo-r16
    inactiveLogMeasInfoList-r16     LogMeasInfoList-r16
}

LogMeasInfoList-r16 ::= SEQUENCE (SIZE (1..maxLogMeas-r16)) OF LogMeasInfo-r16

-- ASN1STOP
```

FIG. 8

HANDLING OF MULTIPLE MINIMIZATION OF DRIVE TEST CONTEXTS IN MULTIPLE RADIO RESOURCE CONTROLLER STATES

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for handling multiple minimization of drive test (MDT) contexts for uses in radio resource controller (RRC) states.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio (E-UTRAN connected to 5G Core, also known as eLTE). It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local breakout and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, healthcare applications).

SUMMARY

In accordance with some example embodiments, a method may include receiving, from a network element, a logged measurement configuration including specific configuration content for a user equipment differentiated per and depending on a connection state of the user equipment. The method may also include performing logging of a measurement per the user equipment's state according to the specific configuration content in the logged measurement configuration. The method may further include transmitting a report of the logged measurement pertaining to one of the user equipment states, to the network element. In an example embodiment, the specific configuration content may restrict the logging according to one or more of a network-based selection criteria, and a user equipment-based selection criteria.

In accordance with some example embodiments, an apparatus may include means for receiving, from a network element, a logged measurement configuration including specific configuration content for a user equipment differentiated per and depending on a connection state of the user equipment. The apparatus may also include means for performing logging of a measurement per the user equipment's state according to the specific configuration content in the logged measurement configuration. The apparatus may also include means for transmitting a report of the logged measurement, pertaining to one of the user equipment states, to the network element. In an example embodiment, the specific configuration content may restrict the logging according to one or more of a network-based selection criteria, and a user equipment-based selection criteria.

In accordance with some example embodiments, an apparatus may include at least one processor and at least one memory including computer program code. The at least one memory and the computer program code may be configured to, with the at least one processor, cause the apparatus at least to receive, from a network element, a logged measurement configuration including specific configuration content for a user equipment differentiated per and depending on a connection state of the user equipment. The apparatus may also be caused to perform logging of a measurement according to the specific to the user equipment's state configuration content in the logged measurement configuration. The apparatus may further be caused to transmit a report of the logged measurement, pertaining to one of the user equipment states, to the network element. In an example embodiment, the specific configuration content may restrict the logging according to one or more of a network-based selection criteria, and a user equipment-based selection criteria.

In accordance with some example embodiments, a non-transitory computer readable medium can be encoded with instructions that may, when executed in hardware, perform a method. The method may receive, from a network element, a logged measurement configuration including specific configuration content for a user equipment differentiated per and depending on a connection state of the user equipment. The method may also perform logging of a measurement per the user equipment's state according to the specific configuration content in the logged measurement configuration. The method may further transmit a report of the logged measurement, pertaining to one of the user equipment's states, to the network element. In an example embodiment, the specific configuration content may restrict the logging according to one or more of a network-based selection criteria, and a user equipment-based selection criteria.

In accordance with some example embodiments, a computer program product may perform a method. The method may receive, from a network element, a logged measurement configuration including specific configuration content for a user equipment differentiated per and depending on a connection state of the user equipment. The method may also perform logging of a measurement per the user equipment's state according to the specific configuration content in the logged measurement configuration. The method may further transmit a report of the logged measurement, pertaining to one of the user equipment states, to the network element. In an example embodiment, the specific configuration content may restrict the logging according to one or more of a network-based selection criteria, and a user equipment-based selection criteria.

In accordance with some example embodiments, an apparatus may include circuitry configured to receive, from a network element, a logged measurement configuration including specific configuration content for a user equipment differentiated per depending on a connection state of the user equipment. The circuitry may also be configured to perform logging of a measurement per the user equipment's state according to the specific configuration content in the logged measurement configuration. The circuitry may further be configured to transmit a report of the logged measurement, pertaining to one of the user equipment states, to the network element. In an example embodiment, the specific configuration content may restrict the logging according to one or more of a network-based selection criteria, and a user equipment-based selection criteria.

In accordance with some example embodiments, a method may include sending, to a user equipment, a logged measurement configuration including specific configuration content for the user equipment differentiated per and depending on a connection state of the user equipment. The method may also include receiving a report of a logged measurement from the user equipment pertaining one of the user equipment states. In an example embodiment, the specific configuration content may restrict the logging according to one or more of a network-based selection criteria, and a user equipment-based selection criteria.

In accordance with some example embodiments, an apparatus may include means for sending, to a user equipment, a logged measurement configuration including specific configuration content for the user equipment differentiated per and depending on a connection state of the user equipment. The apparatus may also include means for receiving a report of a logged measurement from the user equipment pertaining to one of the user equipment states. In an example embodiment, the specific configuration content may restrict the logging according to one or more of a network-based selection criteria, and a user equipment-based selection criteria.

In accordance with some example embodiments, an apparatus may include at least one processor and at least one memory including computer program code. The at least one memory and the computer program code may be configured to, with the at least one processor, cause the apparatus at least to send, to a user equipment, a logged measurement configuration including specific configuration content for the user equipment differentiated per and depending on a connection state of the user equipment. The apparatus may also be caused to receive a report of a logged measurement from the user equipment pertaining to one of the user equipment states. In an example embodiment, the specific configuration content may restrict the logging according to one or more of a network-based selection criteria, and a user equipment-based selection criteria.

In accordance with some example embodiments, a non-transitory computer readable medium can be encoded with instructions that may, when executed in hardware, perform a method. The method may send, to a user equipment, a logged measurement configuration including specific configuration content for the user equipment differentiated per and depending on a connection state of the user equipment. The method may also receive a report of a logged measurement from the user equipment pertaining to one of the user equipment states. In an example embodiment, the specific configuration content may restrict the logging according to one or more of a network-based selection criteria, and a user equipment-based selection criteria.

In accordance with some example embodiments, a computer program product may perform a method. The method may send, to a user equipment, a logged measurement configuration including specific configuration content for the user equipment differentiated per and depending on a connection state of the user equipment. The method may also receive a report of a logged measurement from the user equipment pertaining to one of the user equipment states. In an example embodiment, the specific configuration content may restrict the logging according to one or more of a network-based selection criteria, and a user equipment-based selection criteria.

In accordance with some embodiments, an apparatus may include circuitry configured to send, to a user equipment, a logged measurement configuration including specific configuration content for the user equipment differentiated per depending on a connection state of the user equipment. The circuitry may also be configured to receive a report of a logged measurement by the user equipment pertaining to one of the user equipment states. In an example embodiment, the specific configuration content may restrict the logging according to one or more of a network-based selection criteria, and a user equipment-based selection criteria.

BRIEF DESCRIPTION OF THE DRAWINGS

For proper understanding of example embodiments, reference should be made to the accompanying drawings, wherein:

FIG. 3 illustrates a possible Logged Measurement Configuration (LMC) message ASN.1 syntax and implementation, according to an example embodiment.

FIG. 4 illustrates a second LMC message implementation, according to an example embodiment.

FIG. 5 illustrates an LMC storage implementation, according to an example embodiment.

FIG. 6 illustrates a VarLogMeasConfigInactive (VLMCI) implementation, according to an example embodiment.

FIG. 7 illustrates a VLM Report (VLMR) user equipment (UE) variable implementation, according to an example embodiment.

FIG. 8 illustrates a VLMR Inactive (VLMRI) UE variable implementation, according to an example embodiment.

DETAILED DESCRIPTION

Figure 1:
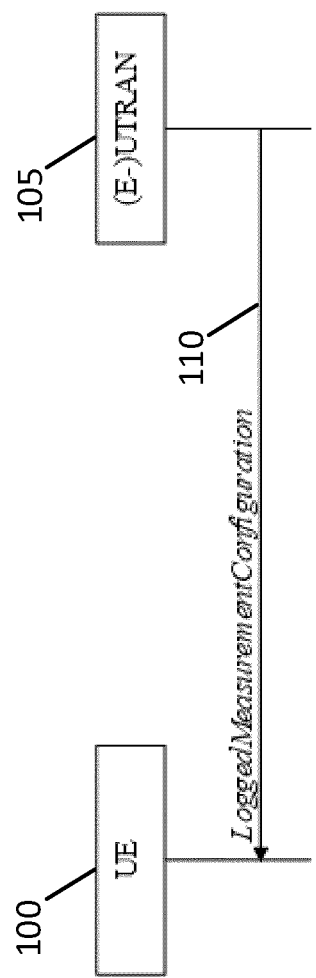
FIG. 1 illustrates an example minimization of drive test (MDT) measurement configuration for logged MDT.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for handling multiple minimization of drive test (MDT) contexts for uses in radio resource controller (RRC) states.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

MDT is a standardized 3$^{rd}$ Generation Partnership Project (3GPP) feature that involves commercial user equipments (UEs) in an automated collection of measurements, and reporting them to the network. The fundamental concept aims at replacing dedicated and costly drive testing performed for network optimization.

MDT involves regular users of a cellular network, and makes usage of their data that are collected (e.g., for mobility purposes). In MDT, two MDT reporting approaches have been defined in Rel-10. One approach is immediate MDT reporting, and a second approach is logged MDT reporting. In immediate MDT reporting, the UE generates a real-time report of radio measurements immediately after performing them. However, in logged MDT reporting, the configuration is done when the UE is in connected mode, and the MDT data collection is done at the UE when the UE enters idle mode. Deferred reports in a form of logs may then be sent when the UE enters the connected mode. As such, MDT measurement records may be placed into MDT trace records and signaled to an operators' operations, administration and management (OAM) entity for further post-processing.

It has been described in 3GPP that radio access network (RAN) centric data collection aims at a mechanism to enable the operators to monitor and optimize their 5G deployments. The ultimate target has been to standardize a method for data collection and utilization. Self-organizing networks (SON) and MDT-oriented solutions (from LTE) have become a baseline for the newly standardized method for data collection. Thus, automated data collection in 5G inherits the two types of MDT reporting approaches to deliver real-time measurements (e.g., results of measurements performed for typical radio resource management (RRM) operations) and non-real time measurement results taken during the time the UE was out of network reach (in RRC_IDLE state), respectively.

In the Rel-10 LTE specification, logged MDT may occur when a UE is in a radio resource controller (RRC) IDLE state. Rel-16, 3GPP radio access network (RAN) centric data collection aims at defining Logged MDT support in new RRC_INACTIVE state too. However, the data storing model for RRC_INACTIVE has not been discussed in 3GPP. Further, when logged measurements are supported for both RRC_IDLE and RRC_INACTIVE states, it is expected that the amount of measurements will grow immensely. An immense increase of logged data, however, may have significant impacts on a) the energy consumption of the UEs to perform the logging and to finally deliver the data to the network, to b) the memory storage at the UE that is limited, and to c) the data usefulness. Therefore, to control the amount of data, certain example embodiments introduced in this application may provide smart MDT configurations for both RRC_INACTIVE and RRC_IDLE states. Logging of measurements in existing specifications are static and do not adapt to varying conditions at the network and/or UE side.

FIG. 1 illustrates an example MDT measurement configuration for logged MDT. In LTE, the network may configure a UE in an RRC CONNECTED state with logged MDT measurements. For example, the configuration may be performed with a Logged Measurement Configuration (LMC) message as illustrated in FIG. 1. For example, the (E-)UTRAN 105 may send a message 110 including the LMC to the UE 100.

An LMC at a UE may be released if it is replaced by another logged MDT configuration, or when a configuration clearance occurs in the sense that some duration timer expires or another expiration condition is met. In existing LTE specifications, logged MDT measurements may only be configured for RRC_IDLE state. The logged measurements may include configuration of downlink pilot strength measurement logging, and configuration of multicast-broadcast single-frequency network (MBSFN) measurement logging for E-UTRA. The logged measurements may also include configuration of the triggering of logging events. For example, only a periodic measurement trigger may be supported where the logging interval is configurable. Other than the period of measurements, a period for storing the measurements may be given. This period may be configured in seconds in multiples of applied IDLE mode discontinuous reception (DRX) (i.e., multiples of 1.28 s). Further, the UE behavior may be unspecified when the UE is configured with a DRX cycle larger than the logging interval.

The logged measurements may further include a network absolute time stamp to be used as a time reference to the UE, and include a trace reference parameter indicated by the OAM. Further, the logged measurements may include a trace recording session reference indicated by the OAM, and transmission configuration indication (TCI) identifier (ID) indicated by the OAM. Moreover, the logged measurements may include an MDT a public land mobile network (PLMN) list that indicates the PLMNs where measurement collection and log reporting are allowed. The indication may depend on whether the MDT is initiated by signaling (signaling based on MDT PLMN list), or by area based configuration (management based MDT PLMN list).

Furthermore, the logged measurements may include configuration of a logging area (optionally). In particular, the logging area defines that the UE will log measurements if it is within a configured logging area which may include a list of 32 global cell identities. If this list is configured, the UE will only log measurements when camping in any of these cells. The logging area may also include a list of up to 8 tracking areas (TAs) or 8 location areas (LAs) or 8 routing areas (RAs). If the list is configured, the UE will only log measurements when camping in any cell belonging to the preconfigured TA/LA/RAs.

In addition, the logged measurements may include configured logging areas that can span PLMNs in the MDT PLMN list. If no area is configured, then a UE will log measurements on all the PLMNs of the MDT PLMN list. The logged measurements may further include a configuration of target MBSFN area(s) for MBSFN measurement logging, and include configuration of WLAN measurements where the UE attempts to obtain WLAN measurements. In addition, the logged measurements may include a configuration of Bluetooth® measurements where the UE attempts to obtain Bluetooth® measurements.

LMCs and logs may be maintained when the UE is in any state of a radio access technology (RAT), even if there exist multiple periods of interruptions when the UE is in a different RAT. Further, there exists a single LMC for logged MDT in the UE for a RAT. In addition, when the network provides a configuration, previously configured LMCs will be replaced by the new configuration, and logged measurements corresponding to previous configurations will be cleared. During these procedures, the network may retrieve data before it is deleted, such as for example, when a new configuration is given to the UE.

In certain cases, the UE may perform WLAN and Bluetooth® measurements only when indicated in the logging configuration. In addition, measurement logging may be performed during logging intervals for which WLAN and Bluetooth® measurements are available. For instance, measurement quantities for WLAN may consist of basic service set identification (BSSID), service set identification (SSID), homogeneous extended service set identification (HESSID) of WLAN Aps, and optionally received signal strength indicator (RSSI) and round-trip time (RTT). For Bluetooth®, measurement logging may include medium access control (MAC) address of Bluetooth® beacons and optionally available RSSI.

In one case, the UE may collect MDT measurements and logs according to its configuration until its memory reserved for MDT is full. If this happens, the UE may stop logging, stop the log duration timer, and start the 48-hour timer.

In RAN2 for 3GPP radio access network (RAN) centric data collection, several requirements were defined for NR MDT at RRC_INACTIVE. For example, logged MDT should also be supported for RRC_INACTIVE and RRC_IDLE. It was also agreed to apply the logged MDT configuration, logged measurements, and reporting procedures to RRC_INACTIVE state. Further, for the logged MDT, the network may send LMCs to the UE in connected mode, and then the UE may collect measurements in RRC_IDLE/INACTIVE. Upon UE restarting the RRC connection, the UE may send available indicator(s) to the network, and then the network may command the UE to send the measurements.

Following the framework, 3GPP defines several requirements specifically for NR MDT and MDT in RRC_INACTIVE. For instance, for UE measurements, in order to limit the impact on UE power consumption and processing, the UE measurement logging may rely on the measurements that are available in R15 NR and existing in LTE MDT as a baseline. Further, the agreements include the release operation for LMCs in the INACTIVE UE, which may be realized only by configuration replacement when the configuration is overwritten or by configuration clearance (due to logging duration expiration).

In a further agreement, for logged MDT measurement collection for RRC_INACTIVE UEs, the actual process of logging within the UE may take place in RRC_INACTIVE and continue in RRC_IDLE states. In addition, the logged measurement stored in the UE during RRC_INACTIVE and IDLE states may be kept for a given common period before they are deleted as in LTE MDT. Further, MDT reporting from RRC_INACTIVE and IDLE states may be preceded by logs availability indicator that indicates the availability of logs at the UE.

Figure 2A:
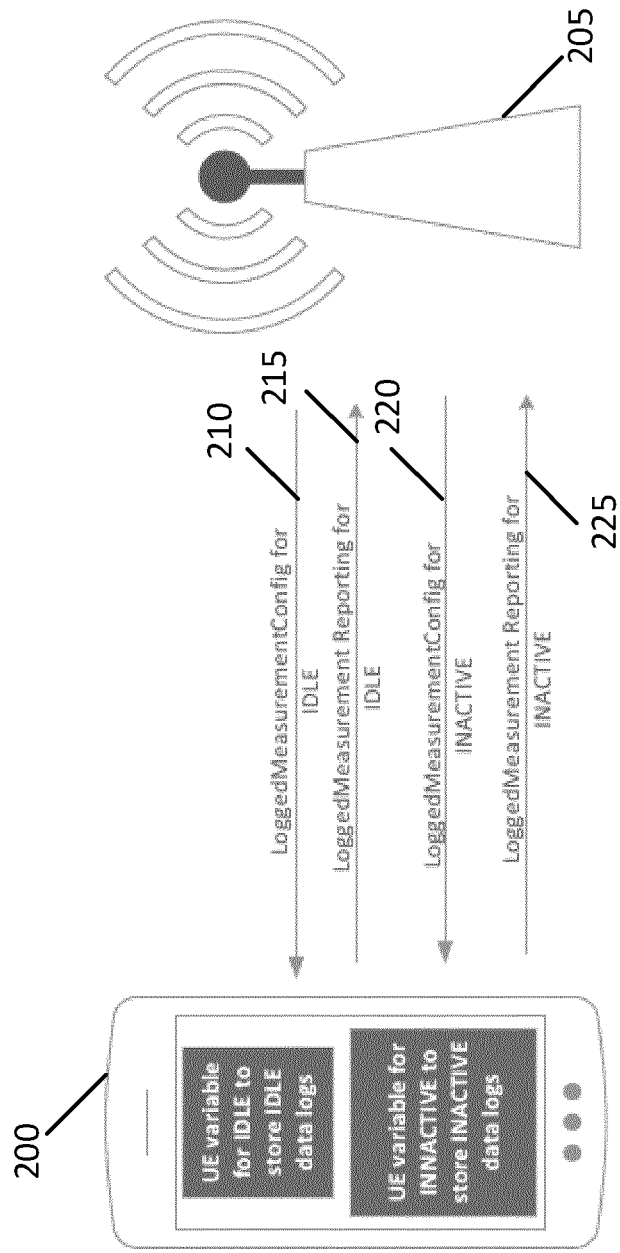
FIG. 2a illustrates a procedure for handling multiple MDT contexts in multiple radio resource controller (RRC) states, according to an example embodiment.
Figure 2B:
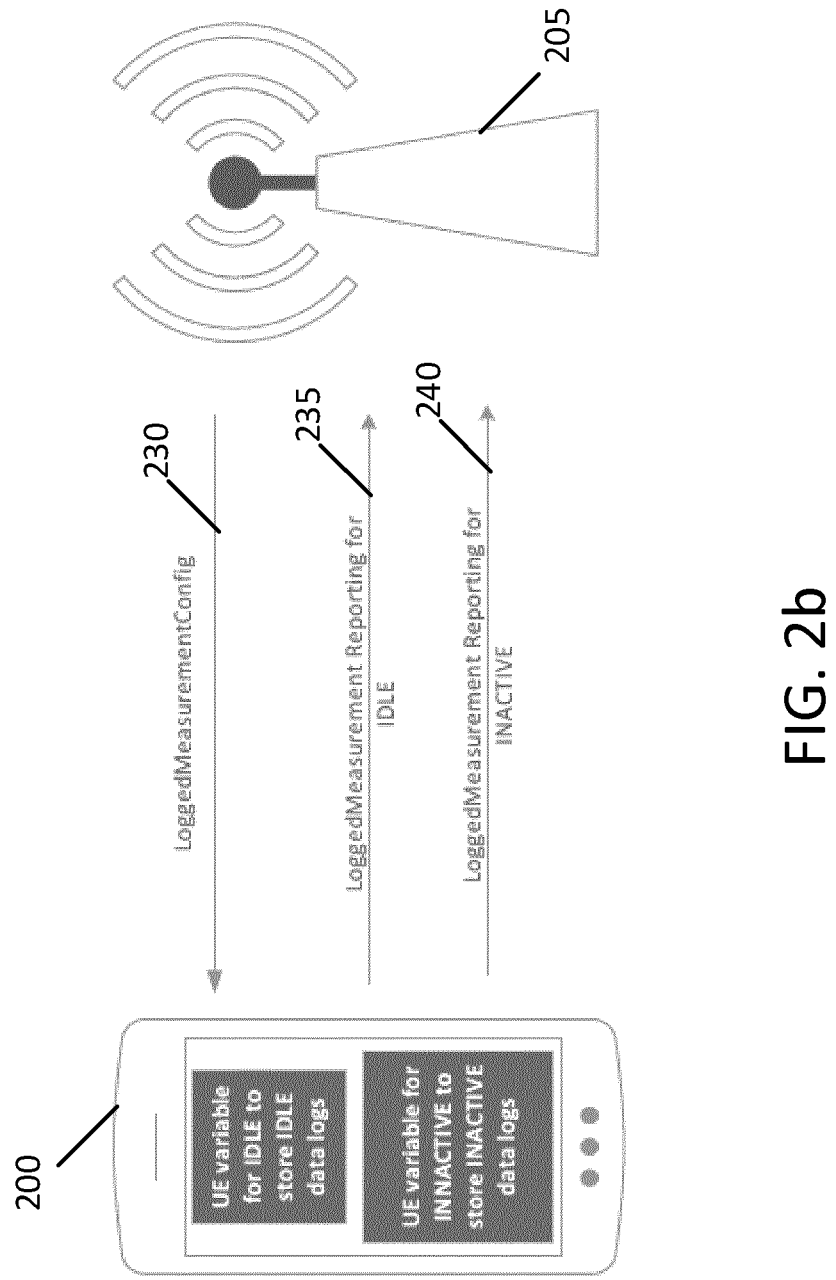
FIG. 2b illustrates another procedure for handling multiple MDT contexts in multiple RRC states, according to an example embodiment.

Logged MDT support for the two RRC states require handling of multiple RRC contexts for logging. FIG. 2a illustrates a procedure for handling multiple MDT contexts in multiple RRC states, according to an example embodiment. FIG. 2b illustrates another procedure for handling multiple MDT contexts in multiple RRC states, according to an example embodiment. According to certain example embodiments, enabling and storing of logging contexts for two different RRC states may be provided. The two different RRC states may include an RRC_IDLE state and an RRC_INACTIVE state. Another example embodiment may define a new data-storing model for the RRC_INACTIVE state.

Since logging of two RRC states may produce a large amount of data, a further example embodiment may provide two methods of selecting data to be allocated from the UE. For example, one method may include a network-based approach where the network may configure the UE with selective configurations based on deployment, configuration, area, or topology. Another method may include a user-based approach where the UE, based on its own internal status (e.g., remaining energy or battery levels), may define the best configuration from a set of configurations that the network configures for it.

The above procedures are illustrated in FIGS. 2a and 2b. As illustrated in FIG. 2a, at 210, the network element 205 may send an LMC message for RRC_IDLE state to the UE

200. At 215, the UE 200, in response to the LMC message 210, may send a logged measurement reporting (LMR) message for RRC_IDLE state to the network element 205. At 220, the network element 205 may send an LMC message for RRC_INACTIVE state to the UE 200. In response, the UE 200 may at 225, send an LMR message for RRC_INACTIVE state to the network element 205.

FIG. 2b illustrates, at 230, the network element 205 sending an LMC message to the UE 200. In an example embodiment, the LMC message 230 may include both its configurations (IDLE and INACTIVE) in a single message. At 235, the UE 200 may send an LMR message to the network element 205 for RRC_IDLE state in response to the LMC message. At 240, the UE 200 may also send an LMR message for RRC_INACTIVE state to the network element 205.

As described above and illustrated in FIGS. 2a and 2b, one example embodiment may have two different and separate logs for storing IDLE and INACTIVE logs. Alternatively, in another example embodiment, the logs may be stored in the same variable. Noted above, certain example embodiments may define a procedure for enabling and storing logging contexts for two different RRC states including, for example, an RRC_IDLE state and an RRC_INACTIVE state. One example embodiment may provide logged MDT configurations that allow differentiation of configuration applicability per RRC state. For example, a State Logging Indication (SLI) information element (IE) (IDLE, INACTIVE) may be introduced in an LMC message indicating whether the measurement configuration is meant for the RRC_IDLE or RRC_INACTIVE states.

According to an example embodiment, a common LMC message may be sent to configure both RRC_IDLE and RRC_INACTIVE states. In this case, the LMC message may be sent with both SLIs enabled, and may include both configuration parameters for RRC_INACTIVE and RRC_IDLE states. Then the UE's two contexts (IDLE and INACTIVE) may require coordinated access to one storing place (e.g., a common VarLogMeasConfig (VLMC) that is accessible by both RRC states. Moreover, in certain example embodiments, different options may be available for the network to configure a UE with logged measurements. For example, in certain embodiments, the LMC may have various ways to differentiate logging configuration applicability to the RRC states as described above with respect to FIG. 2a and FIG. 2b. In one example embodiment, the differentiation of logging configuration applicability to RRC states may include different content of the LMC message. For example, the signaling procedure/message may be the same, however, the content may be different depending on the RRC state.

In another example embodiment, two separate LMC messages may be sent to configure the two RRC states (IDLE and INACTIVE). In this case, the network may separately trigger a UE in the RRC CONNECTED state by sending two different LMC messages with one enabled StateLoggingIndication (SLI) IE, corresponding to either IDLE or INACTIVE. In certain example embodiments, this may allow the network to trigger the UE in RRC_IDLE state to obtain measurements first, before the UE in RRC_INACTIVE state, and vice versa. Alternatively, in other example embodiments, the trigger may occur independently at different states. Here, the two configurations may be kept in the UE's IDLE access stratum (AS) context and INACTIVE AS context. According to an example embodiment, the two configurations may be stored as VarLogMeasConfigIdle (VLMCId) and VarLogMeasConfigInactive (VLMCI), which may result in two logging parameter sets.

According to an example embodiment, one logging parameter set may include logging and/or logging configuration duration timers (Timer T330). The logging duration timers may be maintained according to each configuration. Further, a timer may be defined per each RRC_state. Another logging parameter set may include area scopes. Specifically, area scopes may be maintained per state and covering/triggering logging areas per UE state.

In an example embodiment, when the UE receives a LMC Inactive (LMCI) message, the UE does not discard its VLMCId configuration, but stores them as two different contexts. Further, when the UE receives an LMC Idle (LMCId), the UE does not discard its VLMCI configuration, but stores them both as two different contexts. According to an example embodiment, when the T330 timer expires, a UE may discard stored logged measurements for a particular context by releasing the VLM Report Idle (VLMRId) or VLM Report Inactive (VLMRI) contexts.

As noted above, certain example embodiments may define a new data-storing model for RRC_INACTIVE. In an example embodiment, with logged MDT storage per RRC state, the UE that receives a LMC message with differentiated logging for one or more RRC states indicated, logs measurements on all those states configured. According to certain example embodiments, two options may be provided in this regard.

According to an example, embodiment, as one option, the UE may use a common RRC protocol variable. The common RRC protocol variable may include a VarLogMeasReport (VLMR) to log its measurements with the RRC state where a measurement taken in is logged. Alternatively, two different RRC protocol variables/Reports may be created by the UE including, for example, a VLMRId and a VLMRI. According to an example embodiment, these reports may be stored in separate locations in the memory of the UE. In an example embodiment, storing reports in separate locations in the memory of the UE may be preferable since it makes it easier for the network to process the data based on different contexts. Further, it enables utilization of fragmented parts of the UE's memory, as two smaller parts of the UE's memory may be needed for the log as opposed to a bigger part (which is often harder to find). Thus, certain example embodiments enable further control of the size of the report based on the RRC state of the UE, as the memory reserved for storing the reports of different states does not need to have the same size.

In an example embodiment, the selective configuration, aiming at filtering data and precise scheduling of what contents should be recorded by the UE, may further be realized by two options or their combinations. One option may include a network-based selection of data. Here, the network may configure a UE with the most promising configuration. The most promising configuration may be selected by the network based on several parameters.

One parameter may be the UE type. In this case, a UE may be a normal mobile, a vehicle-to-everything (V2X) vehicle or a relay UE. According to an example embodiment, more measurements (smaller logging periodicity and larger logging duration) may be requested from UEs that are not limited by certain energy restrictions (e.g., from the V2X vehicle and the relay). In an example embodiment, the network may determine the "most promising" configuration based on the UE capabilities element. For instance, the UE type may be scheduled from the core network towards the RAN entity as an attribute, or may be decided directly by the RAN entity. The RAN entity may have knowledge of the UE capabilities, and may be able to obtain the information directly before scheduling an MDT session.

A regular mobile device or MTC or narrowband internet of things (Nb-IoT) may not be categorized by the network as a type of users with lower potential to record a large amount of data. However, the network may select the UEs specifically when troubleshooting concerns the group of users. When the network is interested in long lasting logging sessions, it may decide to select the users with no or limited-power concerns (e.g., a V2X vehicle).

A second parameter may be area. Here, the network may obtain UE location information and then use this information to configure more or less measurements for a UE. For example, in one embodiment, in areas of poor coverage, or areas where the network has received a large number of radio link failures (RLFs), more measurements may be requested from the UEs. Due to new RRC state involvement in logging sessions, and selective configuration, area scope may be based on RAN-based notification area (RNA).

A third parameter may include a PLMN network where the measurements are taken. Here, different measurement granularities may be defined for different PLMNs. For example, more frequent measurements may be requested by UEs roaming at neighboring PLMNs so that the network may obtain information on service in neighboring PLMNs. Moreover, PLMNs may be a set of PLMN-IDs covering a shared network (including shared 4G and 5G radio access technologies (RATs)).

A second option of what contents should be recorded by the UE may be a UE-based selection of data. In this option, the network may configure the UE with multiple configurations (e.g., x number of configurations) in the LMC message. In an example embodiment, those configurations may have a different logging periodicity and a different logging duration. Furthermore, each configuration may depend on the RRC state of the UE (INACTIVE or IDLE), and different states may have different configurations. Additionally, in certain example embodiments, different triggering conditions may be defined and sent from the network to the UE to enable a UE to select the best configuration each time. According to certain example embodiments, those triggering conditions may depend on the UE.

For example, in one embodiment, the trigger on which the configuration may be used is a condition that is satisfied at the UE. According to an example embodiment, one triggering condition may relate to remaining battery levels. In this energy consumption case, the network may configure different measurement configurations based on a range of remaining battery power at the UE. For example, in the energy consumption case, when the leftover battery capacity at the UE is in the range of 90-100% of its leftover battery capacity (meaning that the battery is full or almost full), the UE may use the configuration corresponding to this condition. Further, when the leftover battery capacity at the UE drops to a different level, the UE may trigger usage of a different configuration. In another example embodiment, the network may request more aggressively measurements from the UE as opposed to when the UE's battery power is almost depleted (e.g., in the range of 0-10%). Alternatively, in another example embodiment, the dropping in energy levels (e.g., by looking at the gradient) may be used to determine switching of a configuration. For example, if the gradient of energy consumption associated with a configuration exceeds a threshold, the UE may switch to a less energy-consuming configuration. Further, UEs with weaker batteries may in this way request less measurements. In addition, if the UE is reconfigured to a different MDT logging configuration, it does not empty its log file unless the timer T330 for the reporting state expires.

According to an example embodiment, another triggering condition may include the remaining memory capacity at the UE. For instance, similar triggers as those described above may be used with the remaining memory. In an example embodiment, when the available memory reserved for measurements in a given state (IDLE or INACTIVE) is almost empty, the UE may log measurements more aggressively as opposed to a case when the UE's memory is almost full.

In an example embodiment, the UE may select the best measurement configuration according to its internal conditions. Specifically, the UE may record the measurement configuration in its VLMR if the LMC message is according to the UE type or 2 separate logs, VLMRId and/or VLMRI if the LMC message is according to a specific area, and depending on the state of the logging. In another example embodiment, the network receiving the reports from the UEs may learn what the best MDT configurations are per RRC state, and update the configuration or configurations that it signals to a UE. The network may also do this for example, by examining the energy consumed reporting under a given configuration divided by the useful measurements that the network received from the logging. In an example embodiment, usefulness measurements may refer to the amount of measurements that the network received and which are not too similar to the ones it has already received.

FIG. 3 illustrates a possible LMC message ASN.1 syntax and implementation, according to an example embodiment. According to FIG. 3, the gNB and the UE may be compliant with the RRC protocol version that support the embodiments, and should be able to comprehend, understand and act on the message, as encoded. Further, FIG. 4 illustrates a second LMC message implementation, according to an example embodiment. In addition, FIG. 5 illustrates an LMC storage implementation, according to an example embodiment. With LMC storage, the configurations may need to be stored in the UE's AS layer. In the case of FIG. 3 for two separate configurations, the variables illustrated in FIGS. 5-8 may be reserved in the UE memory as VLMCId. According to an example embodiment, the UE variable VLMCId may include the configuration of the logging of measurements to be performed by the UE while in the RRC_IDLE state, as illustrated in FIG. 5.

In another example embodiment, the UE variable VLMCI may include the configuration of the logging of measurements to be performed by the UE while in the RRC_INACTIVE state, as illustrated in FIG. 6. According to another example embodiment, the logs taken by the UE may need to be stored in the UE's AS layer, for example with respect to LMC message configuration illustrated in FIGS. 3 and 4. With the cases of FIGS. 3 and 4, two variables may guarantee cleaner modeling for data storage in the UE, and a simpler reference for the network to retrieve the data.

FIG. 7 illustrates a VLMR UE variable, according to an example embodiment. Here, the UE variable VLMR may include the logged measurements information from the RRC_IDLE state. Further, FIG. 8 illustrates a VLMRI UE variable, according to an example embodiment. Here, the UE variable VLMRI may include the logged measurements information from the RRC_INACTIVE state.

Figure 9:
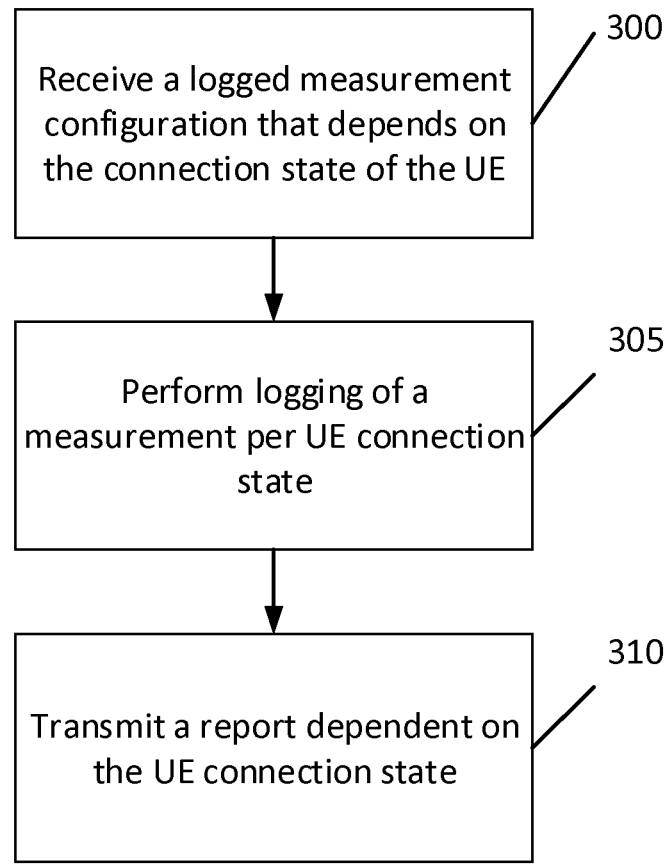
FIG. 9 illustrates a flow diagram of a method, according to an example embodiment.

FIG. 9 illustrates a flow diagram of a method, according to an example embodiment. In certain example embodiments, the flow diagram of FIG. 9 may be performed by a mobile station and/or UE, for instance similar to apparatus 10 illustrated in FIG. 11a. According to one example embodiment, the method of FIG. 9 may include initially at 300, receiving, from a network element, a logged measurement configuration including specific configuration content for a user equipment differentiated per and depending on a connection state of the user equipment. The method may also include, at 305, performing logging of a measurement per the user equipment's state according to the specific configuration content in the logged measurement configuration. The method may also include, at 310, transmitting a report of the logged measurement pertaining to one of the user equipment states, to the network element.

According to an example embodiment, the specific configuration content may restrict the logging according to one or more of a network-based selection criteria, and a user equipment-based selection criteria. According to other example embodiments, other than the UE connection states, 300, 305, and 310 may depend on UE based selection criteria. For example, the UE based selection criteria may include the UE internal conditions in terms of battery and memory described herein. Alternatively, 300, 305, and 310 may be dependent on network-based criteria including, for example, user equipment type, coverage area, and network configurations described herein.

In an example embodiment, the network-based selection criteria may include at least one of a user equipment parameters dependent on a user equipment type, a coverage area parameter of the user equipment, a user equipment's connection state specific parameter, and a communication service type parameter. In another example embodiment, the user equipment-based selection criteria may define trigger conditions for logging by the user equipment, and the trigger conditions may include a remaining battery level of the user equipment, and a remaining memory capacity at the user equipment.

According to an example embodiment, the logged measurement configuration may be received in a common logged measurement configuration message or in a plurality of logged measurement configuration messages. According to another example embodiment, the logged measurement configuration may define a logging periodicity and duration of the user equipment according to the connection state of the user equipment. According to a further example embodiment, the connection state of the user equipment may include a radio resource controller connected state, a radio resource controller inactive state, and a radio resource controller idle state. In an example embodiment, access to a storing place by the user equipment may be coordinated between connection states of the user equipment.

Figure 10:
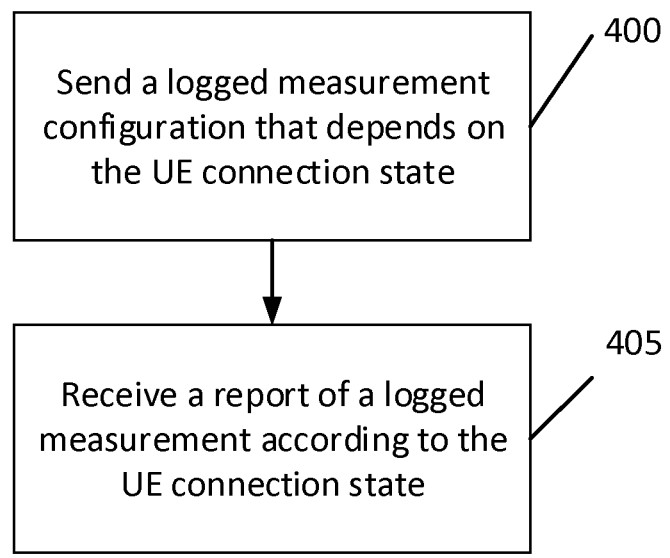
FIG. 10 illustrates a flow diagram of another method, according to an example embodiment.

FIG. 10 illustrates a flow diagram of another method, according to an example embodiment. In certain example embodiments, the flow diagram of FIG. 10 may be performed by a network entity or network node in a 3GPP system, such as LTE or 5G-NR. For instance, in some example embodiments, the method of FIG. 10 may be performed by a base station, eNB, or gNB, for instance similar to apparatus 20 illustrated in FIG. 11*b*.

According to one example embodiment, the method of FIG. 10 may include initially, at 400, sending, to a user equipment, a logged measurement configuration including specific configuration content for the user equipment differentiated per and depending on a connection state of the user equipment. The method may also include, at 405, receiving a report of a logged measurement from the user equipment pertaining to one of the user equipment states. In an example embodiment, the specific configuration content may restrict the logging according to one or more of a network-based selection criteria, and a user equipment-based selection criteria.

According to an example embodiment, other than the UE connection states, 400 and 405 may depend on UE based selection criteria. For example, the UE based selection criteria may include the UE internal conditions in terms of battery and memory described herein. Alternatively, 400 and 405 may be dependent on network-based criteria including, for example, user equipment type, coverage area, and network configurations described herein.

In an example embodiment, the network-based selection criteria may include at least one of a user equipment parameters dependent on a user equipment type, a coverage area parameter of the user equipment, a user equipment's connection state specific parameter, and a communication service type parameter. In another example embodiment, the user equipment-based selection criteria may define trigger conditions for logging by the user equipment, and the trigger conditions may include a remaining battery level of the user equipment, and a remaining memory capacity at the user equipment. In a further example embodiment, the logged measurement configuration may be sent in a common logged measurement configuration message or in a plurality of logged measurement configuration messages.

According to an example embodiment, the logged measurement configuration may define a logging periodicity and duration of the user equipment according to the connection state of the user equipment. According to another example embodiment, the logged measurement configuration may authorize the user equipment in a first connection state to log measurements before the user equipment in a second connection state can log measurements.

Figure 11A:
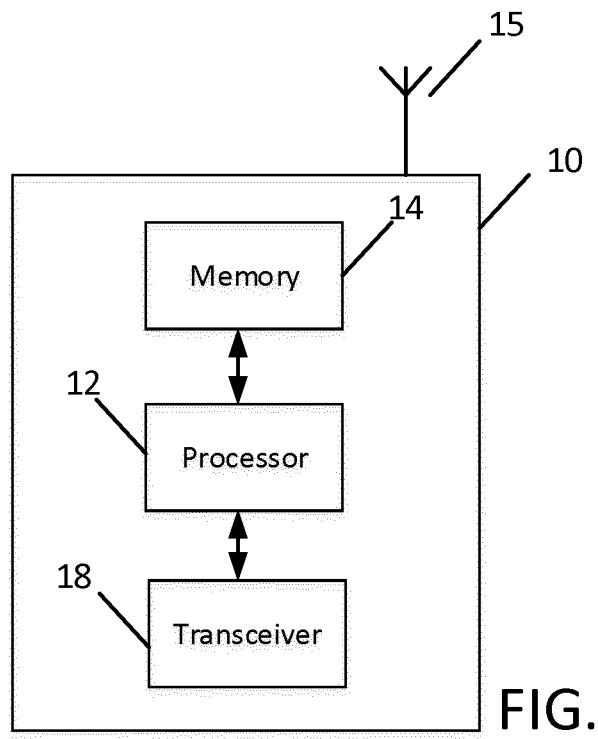
FIG. 11a illustrates a block diagram of an apparatus, according to an example embodiment.

FIG. 11*a* illustrates an example apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 11*a*.

As illustrated in the example of FIG. 11*a*, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

While a single processor 12 is shown in FIG. 11a, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 18 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE, mobile device, mobile station, ME, IoT device and/or NB-IoT device, for example. According to certain embodiments, apparatus 10 may be controlled by memory 14 and processor 12 to perform the functions associated with example embodiments described herein. For example, in some embodiments, apparatus 10 may be configured to perform one or more of the processes depicted in any of the flow charts or signaling diagrams described herein, such as the flow diagrams illustrated in FIGS. 1-9.

For instance, in one embodiment, apparatus 10 may be controlled by memory 14 and processor 12 to receive, from a network element, a logged measurement configuration including specific configuration content for a user equipment differentiated per and depending on a connection state of the user equipment. Apparatus 10 may also be controlled by memory 14 and processor 12 to perform logging of a measurement per the user equipment's state according to the specific configuration content in the logged measurement configuration. Apparatus 10 may further be controlled by memory 14 and processor 12 to transmit a report of the logged measurement pertaining to one of the user equipment states, to the network element. In an example embodiment, the specific configuration content restricts the logging according to one or more of a network-based selection criteria, and a user equipment-based selection criteria.

Figure 11B:
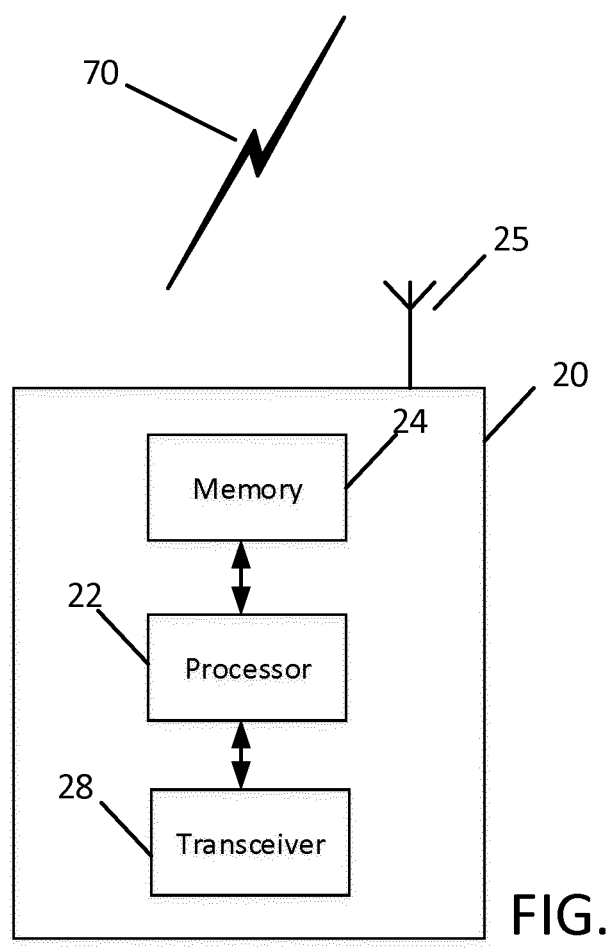
FIG. 11b illustrates a block diagram of another, apparatus according to an example embodiment.

FIG. 11b illustrates an example of an apparatus 20 according to an example embodiment. In an example embodiment, apparatus 20 may be a node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. In certain example embodiments, apparatus 20 may be an eNB in LTE or gNB in 5G.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 11*b*.

As illustrated in the example of FIG. 11*b*, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 20 may be a network node or RAN node, such as a base station, access point, Node B, eNB, gNB, WLAN access point, or the like. In another example embodiment, apparatus 20 may be an LFM. According to certain embodiments, apparatus 20 may be controlled by memory 24 and processor 22 to perform the functions associated with any of the embodiments described herein, such as the flow or signaling diagrams illustrated in FIGS. 1-8 and 10.

For instance, in one embodiment, apparatus 20 may be controlled by memory 24 and processor 22 to send, to a user equipment, a logged measurement configuration including specific configuration content for the user equipment differentiated per and depending on a connection state of the user equipment. Apparatus 20 may also be controlled by memory 24 and processor 22 to receive a report of a logged measurement from the user equipment pertaining to one of the user equipment states. In an example embodiment, the specific configuration content restricts the logging according to one or more of a network-based selection criteria, and a user equipment-based selection criteria.

Certain example embodiments described herein provide several technical improvements, enhancements, and/or advantages. In some example embodiments, it may be possible to control the amount of data in logged measurement scenarios, and to avoid a large increase logged data. As such, it may be possible to avoid negative impact on the energy consumption and memory storage at the UEs.

In other example embodiments, it may be possible to collect user equipment's state specific data. According to further embodiments, it may be possible to detect state characteristics or failures, and therefore apply trouble shooting or network optimization specifically per the state. In other example embodiments, it may be possible to provide a network that triggers the MDT logging for INACTIVE state UEs by amending the RRC release message. According to further example embodiments, it may be possible for UEs to tag the measurement results to indicate the RRC state. As such, certain example embodiments provide a way to differentiate MDT logged measurement activation and contents for RRC_IDLE and RRC_INACTIVE states, which has not previously been provided for.

According to certain example embodiments, it may also be possible to provide a method and apparatus for inter-RAT load balancing of MC-DSS (MC-DSS LB) that maximizes user throughputs and improves reliability by iteratively and equitably adjusting certain elements. For example, the adjustments may include 1) the RSS or power headroom thresholds and target assignment proportions for primary carrier assignment. The adjustments may also include, 2) the partitioning of shared resource pools, and 3) the TDD frame configuration. With certain example embodiments, it may be possible to take into consideration the load of other RATs when assigning users to the primary carriers in order to allow enough resources for the other RAT. It may also be possible to consider the load of the other RATs when calculating TDD UL/DL split and shared resource pool split. The result may be a throughput-optimized allocation of common resources for both RATs used by an operator.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

| Partial Glossary | |
|---|---|
| 3GPP | 3$^{rd}$ Generation Partnership Project |
| AMF | Access Management Function |
| eNB | Enhanced Node B |
| gNB | 5G or NR Base Station |
| LTE | Long Term Evolution |
| MDT | Minimization of Drive Tests |
| MTC | Machine-type Communication |
| Nb-IoT | Narrowband Internet of Things |
| NR | New Radio |
| OAM | Operations, Administration and Management |
| PLMN | Public Land Mobile Network |
| RAN | Radio Access Network |
| RLF | Radio Link Failure |
| RRC | Radio Resource Controller |
| RRM | Radio Resource Management |
| UE | User Equipment |

We claim:

1. A method performed by a user equipment connectable to a network element and comprising at least one processor and at least one memory comprising a computer program code configured to perform the method, the method comprising:

receiving, from the network element, a logged measurement configuration comprising specific configuration content for the user equipment differentiated per and depending on a connection state of the user equipment, wherein the connection state of the user equipment comprises a radio resource controller connected state, a radio resource controller inactive state, and a radio resource controller idle state;

performing logging of a measurement per the connection state of the user equipment according to the specific configuration content in the logged measurement configuration; and transmitting a report of the logged measurement pertaining to one of the connection states of the user equipment, to the network element, wherein the specific configuration content restricts the logging according to one or more of a network-based selection criteria, and a user equipment-based selection criteria, wherein the logged measurement configuration defines a logging periodicity and duration of the user equipment dependent upon the connection state of the user equipment, wherein the user equipment-based selection criteria defines trigger conditions for logging by the user equipment, wherein the trigger conditions comprise a remaining battery level of the user equipment, and a remaining memory capacity at the user equipment, and wherein the network-based selection criteria comprises:
a user equipment parameter dependent on a user equipment type;
a coverage area parameter of the user equipment;
a user equipment's connection state specific parameter; and
a communication service type parameter.

2. The method according to claim 1, wherein the user equipment uses a common RRC protocol variable that includes a VarLogMeasReport (VLMR) to log its measurements with a RRC state where a measurement taken in is logged and wherein two different RRC protocol variables are created by the user equipment and then stored in separate locations in the memory of the user equipment.

3. The method according to claim 1, wherein for the triggering condition comprising the remaining memory capacity at the user equipment, when available memory reserved for measurements in a given state (IDLE or INACTIVE) is almost empty, the user equipment logs measurements more aggressively.

4. The method according to claim 1, wherein the logged measurement configuration is received in a common logged measurement configuration message or in a plurality of logged measurement configuration messages.

5. The method according to claim 1, wherein access to a storing place by the user equipment is coordinated between connection states of the user equipment.

6. A method, performed by an apparatus being a network element connectable to a user equipment and comprising at least one processor and at least one memory comprising a computer program code configured to perform the method, the method comprising:

sending, to the user equipment, a logged measurement configuration comprising specific configuration content for the user equipment differentiated per and depending on a connection state of the user equipment, wherein the connection state of the user equipment comprises a radio resource controller connected state, a radio resource controller inactive state, and a radio resource controller idle state; and logging of a measurement per the connection state of the user equipment according to the specific configuration content in the logged measurement configuration is performed by the user equipment; and receiving a report of a logged measurement from the user equipment pertaining to one of connection states of the user equipment, wherein the specific configuration content restricts the logging according to one or more of a network-based selection criteria, and a user equipment-based selection criteria, wherein the logged measurement configuration defines a logging periodicity and duration of the user equipment dependent upon the connection state of the user equipment, wherein the user equipment-based selection criteria defines tripper conditions for lopping by the user equipment, wherein the trigger conditions comprise a remaining battery level of the user equipment, and a remaining memory capacity at the user equipment, and wherein the network-based selection criteria comprises:
a user equipment parameter dependent on a user equipment type;
a coverage area parameter of the user equipment;
a user equipment's connection state specific parameter; and
a communication service type parameter.

7. The method according to claim 6, wherein the logged measurement configuration is sent in a common logged measurement configuration message or in a plurality of logged measurement configuration messages.

8. The method according to claim 6, wherein the logged measurement configuration authorizes the user equipment in a first connection state to log measurements before the user equipment in a second connection state can log measurements.

9. A computer program embodied on a non-transitory computer-readable medium, said computer program comprising instructions which, when executed in hardware, cause the hardware to perform the method according to claim 1.

10. A computer program embodied on a non-transitory computer-readable medium, said computer program comprising instructions which, when executed in hardware, cause the hardware to perform the method according to claim 6.

11. A user equipment comprising:
at least one processor; and
at least one memory including computer program code;
the at least one memory and the computer program code configured to, with the at least one processor, cause the user equipment to:
receive, from the network element, a logged measurement configuration comprising specific configuration content for the user equipment differentiated per and depending on a connection state of the user equipment, wherein the connection state of the user equipment comprises a radio resource controller connected state, a radio resource controller inactive state, and a radio resource controller idle state;
perform logging of a measurement per the connection state of the user equipment according to the specific configuration content in the logged measurement configuration; and transmit a report of the logged measurement pertaining to one of the connection states of the user equipment, to the network element, wherein the specific configuration content restricts the logging according to one or more of a network-based selection criteria, and a user equipment-based selection criteria, wherein the logged measurement configuration defines a logging periodicity and duration of the user equipment dependent upon the connection state of the user equipment, wherein the user equipment-based selection criteria defines trigger conditions for logging by the user equipment, wherein the trigger conditions comprise a remaining battery level of the user equipment, and a remaining memory capacity at the user equipment, and wherein the network-based selection criteria comprises:

a user equipment parameter dependent on a user equipment type;

a coverage area parameter of the user equipment;

a user equipment's connection state specific parameter; and a communication service type parameter.

* * * * *